C. E. SPECK & F. W. HENSCHEN.
BICYCLE PUMP.
APPLICATION FILED JULY 11, 1908.

916,211.

Patented Mar. 23, 1909.

Witnesses
Rose S. Johnson
M. L. Skinner.

Inventors
C. E. Speck
and F. W. Henschen
By Watson E. Coleman
Attorney

UNITED STATES PATENT OFFICE.

CHARLES E. SPECK AND FREDERICK W. HENSCHEN, OF ST. MARYS, OHIO.

BICYCLE-PUMP.

No. 916,211.          Specification of Letters Patent.        Patented March 23, 1909.

Application filed July 11, 1908. Serial No. 443,106.

*To all whom it may concern:*

Be it known that we, CHARLES E. SPECK and FREDERICK W. HENSCHEN, citizens of the United States, residing at St. Marys, in the county of Auglaize and State of Ohio, have invented certain new and useful Improvements in Bicycle-Pumps, of which the following is a specification, reference being had to the accompanying drawings.

This invention relates to improvements in pumps and devices for fastening the same to the frame of a bicycle or vehicle.

The object of the invention is to provide a fastening device for a pump, whereby the latter will have a swinging or universal connection with the frame of a bicycle or the like to permit it to be turned to any desired position without regard to the position of the frame in order that the pump may be conveniently operated, means being provided for holding the pump against the frame and out of the way when not in use.

With the above and other objects in view the invention consists of the novel features of construction and the combination and arrangement of parts hereinafter fully described and claimed, and illustrated in the accompanying drawings, in which—

Figure 1:
Figure 3:
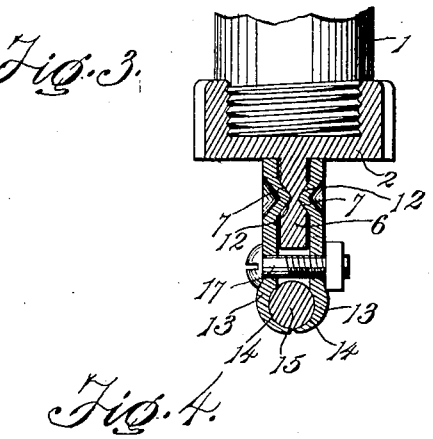
Figure 4:
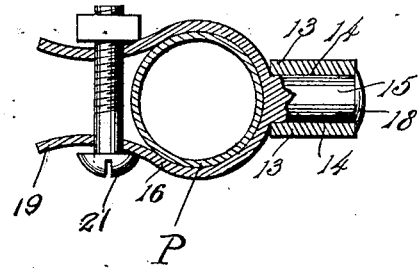
Figure 2:
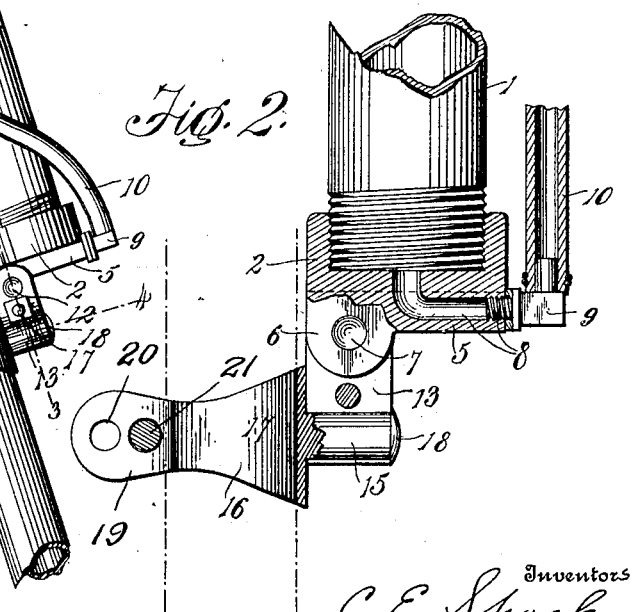
Figure 5:
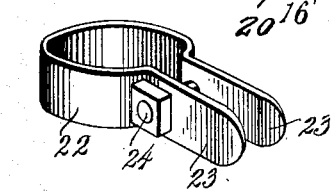

Figure 1 is a side elevation of the improved pump, showing it applied to one of the tubes or bars of a bicycle frame; Fig. 2 is a detail vertical section through the bottom of the pump and its fastening device; Figs. 3 and 4 are sectional views taken, respectively, on the planes indicated by the lines 3—3 and 4—4 in Fig. 1; and Fig. 5 is a detail view of the clamp for fastening the upper or free end of the pump.

1 denotes the body or barrel of the improved pump which may be mounted on any of the bars or posts of a bicycle frame or the like, but which, as illustrated in Fig. 1, is applied to the rear seat post or brace P. The body 1 is cylindrical and has its lower end screwed into a base or head 2 and its upper end formed with an opening to receive the piston rod 3, the projecting upper or outer end of which latter is preferably provided with a spherical or ball-like handle 4. The base 2 of the pump is formed upon its bottom with a transverse rib 5 adjacent to one end of which is a depending lug or ear 6 having in its side faces oppositely disposed cone-shaped bearing recesses 7. In the other end of the rib 5 is formed a bore or passage 8, the inner end of which is in communication with the body or cylinder 1 and into the outer end of which is screwed an angular connection 9 for the attachment of the usual flexible tube 10. This tube, it will be understood, is of sufficient length to permit the connection 11 at its free end to be applied to the valve of the tire of either of the wheels of the bicycle. The recesses 7 in the lug or ear 6 are adapted to receive cone-shaped pivot projections 12 formed adjacent to the ends of two plates 13 which are carried by the post or support P so that the pump will be pivotally mounted to swing toward and from the same. The plates 13 are formed at their opposite ends with oppositely disposed and transversely extending recesses 14 which receive between them a pivot 15 carried by a clamp 16 arranged upon the post P. Said pivot projects radially from the clamp body 16, which latter is substantially U-shaped, and by reason of the rotatable engagement of the clamping plates 13 with the same, the pump is permitted to swing into a plane at right angles to the post P so that the pump may be disposed in a vertical position when the post P is horizontal. The plates 13 are united by a clamping bolt 17 which is passed through registering apertures formed in them intermediate their ends, and which when tightened draws said plates together to cause them to frictionally bind the pivot 15 and the lug 6 between them.

It will be noted that the axis of the pivot 15 is disposed in a plane at right angles to the axis of the pivots 12 so that the body of the pump will not only be swung outwardly or away from the post P but also in a plane at right angles to such swinging movement, thereby permitting the pump to be disposed in an upright position or in any inclined or angular position without regard to the position of the frame of the bicycle. This swiveled connection is exceedingly advantageous in that it permits the body of the pump to be turned to a position convenient for operation when the bicycle is in an upright position, or in an inverted position, or when lying horizontal upon either side. Owing to the frictional contact of the clamping and connecting plates or members 13 the body of the pump will be retained in any adjusted position and will not need to be supported by the hand or any extraneous supporting means.

The pivot 15 has a retaining head 18 upon its outer end and it projects from the center of the clamp 16, which latter is in the form of a substantially U-shaped clip adapted to receive the post P and provided in its projecting arms 19 with registering openings 20 to receive a clamping bolt 21. By constructing the clamp or clip 16 in this manner, it may be readily applied to any of the brace bars or posts of bicycles or the like of different sizes and may be effectively secured at any desired position upon such bars or posts.

When the pump is not in use, it is effectively retained in an out-of-the-way position upon the post P by a clamp 22 arranged upon the upper part of the post and having resilient jaws or arms 23 to receive the piston rod 3 between them. Said clamp 22 is in the form of a U-shaped clip to receive and surround the post and it is retained thereon by a bolt 24 passed through alining openings in its arms, the outer ends of which latter form the jaws 23. Before the pump is swung against the post the tube 10 is wrapped around the same so that it also will be retained in an out-of-the-way position when the piston rod is retained between the jaws 23.

From the foregoing it will be seen that the invention provides an exceedingly simple and inexpensive fastening means for mounting a pump upon a bicycle frame or the like, and one which will be exceedingly convenient since it will permit the pump to be disposed at any position for convenient operation without regard to the position of the bicycle. Furthermore, the connection of the pump with the bicycle causes the latter to serve as a stationary support for the pump when in operation, thereby rendering it unnecessary to hold or steady the pump by means of the foot or any other way. It will be further noted that the fastening or connection is strong and durable and will permit the pump to be applied to any part of a bicycle frame or the like.

Having thus described the invention what is claimed is:

A device of the character described comprising a clamp to engage a bar of a bicycle or the like provided with a radially projecting cylindrical pivot stud having a head at its outer end, a pump body provided with a pivot lug having pivot bearings, and a connecting and clamping device consisting of opposing plates having centrally arranged registering apertures and opposing pivot receiving seats at one end, said seats being adapted to receive said cylindrical pivot stud between them, the opposite ends of said plates having co-acting pivot bearings to engage the pivot bearings on said lug whereby the pump body will be pivoted to said connecting and clamping device in a plane at right angles to the plane of the axis of said cylindrical pivot stud, and a clamping bolt passed through the registering apertures in said plates.

In testimony whereof we hereunto affix our signatures in the presence of two witnesses.

CHARLES E. SPECK.
FRED. W. HENSCHEN.

Witnesses:
J. F. STOUT,
LEWIS F. STOUT.